United States Patent
Smith et al.

(10) Patent No.: US 8,750,183 B2
(45) Date of Patent: *Jun. 10, 2014

(54) MOBILE-ORIGINATED TO HTTP COMMUNICATIONS

(75) Inventors: Richard A. Smith, Annapolis, MD (US); Johanna Wilson, Annapolis, MD (US)

(73) Assignee: Patent Monetization Associates, L.P., Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,657

(22) Filed: Aug. 22, 2012

(65) Prior Publication Data

US 2012/0329491 A1    Dec. 27, 2012

Related U.S. Application Data

(63) Continuation of application No. 12/073,621, filed on Mar. 7, 2008, now Pat. No. 8,260,329, which is a continuation of application No. 11/113,033, filed on Apr. 25, 2005, now Pat. No. 7,355,990, which is a continuation of application No. 09/588,460, filed on Jun. 6, 2000, now Pat. No. 6,891,811.

(60) Provisional application No. 60/198,108, filed on Apr. 18, 2000.

(51) Int. Cl.

| | |
|---|---|
| *H04W 84/18* | (2009.01) |
| *H04W 76/02* | (2009.01) |
| *H04L 29/06* | (2006.01) |
| *H04J 1/14* | (2006.01) |
| *H04W 4/14* | (2009.01) |
| *H04H 40/27* | (2008.01) |
| *H04W 8/26* | (2009.01) |

(52) U.S. Cl.
USPC ........ 370/310; 455/466; 455/404.2; 370/328; 370/400; 370/401; 370/404; 370/464; 370/489; 370/493; 370/492; 370/496; 709/249; 709/238

(58) Field of Classification Search
CPC ..... H04W 4/14; H04W 28/065; H04W 40/02; H04W 4/005; H04W 40/30; H04W 52/0212; H04W 8/00; H04W 8/26; H04L 45/44; H04L 5/14; H04L 67/06; H04H 20/33; H04H 20/426; H04H 40/27
USPC ......................................................... 455/466
See application file for complete search history.

(56) References Cited

U.S. PATENT DOCUMENTS 1,103,073 A    7/1914   O'Connel
(Continued)

FOREIGN PATENT DOCUMENTS

WO    WO98/11744    9/1997
(Continued)

OTHER PUBLICATIONS

Java-Centric Distributed Computing by Wollrath, A et al..; IEEE, vol. 17 Issue 3, May-Jun. 1997, pp. 44-53.
(Continued)

*Primary Examiner* — Lester Kincaid
*Assistant Examiner* — Diego Herrera
(74) *Attorney, Agent, or Firm* — William H. Bollman

(57) ABSTRACT

A mobile device-to-HTTP protocol gateway (MHG) which translates between Wireless Mobile Originated commands from an SMSC, and an application server on the Internet. A wireless Internet gateway establishes communications with one or more relevant SMSCs using standard format SMPP commands, and the MHG utilizes HTTP protocol POST messages to post short messages originated at the mobile device to a particular URL. Return results are received by the MHG via HTTP protocol messages, translated to SMPP messages, and forwarded back to the SMSC for delivery to the mobile device. The wireless Internet Gateway communicates with the MHG using RMI protocol commands. An MHG in the present invention enables a developer to create mobile applications using standard web development tools. The MHG allows standard format command messages to be used throughout the pathway between a mobile device and an application program on a web IP server at a particular URL.

54 Claims, 8 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinami |
| 5,081,667 A | 1/1992 | Drori et al. |
| 5,119,104 A | 6/1992 | Heller |
| 5,144,283 A | 9/1992 | Arenas et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell et al. |
| 5,235,630 A | 8/1993 | Moodey et al. |
| 5,239,570 A | 8/1993 | Koster et al. .................. 709/203 |
| 5,243,645 A | 9/1993 | Bissell et al. |
| 5,266,944 A | 11/1993 | Carroll et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergreen et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singere et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro et al. |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarak et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,694,546 A | 12/1997 | Reisman |
| 5,740,534 A | 4/1998 | Ayerst et al. |
| 5,754,636 A | 5/1998 | Bayless |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vanttila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | Delorme et al. |
| 5,806,000 A | 9/1998 | Vo et al. |
| 5,822,700 A | 10/1998 | Hult et al. |
| 5,828,740 A | 10/1998 | Khuc et al. |
| 5,905,736 A | 5/1999 | Ronen et al. |
| 5,920,821 A | 7/1999 | Seazholtz et al. |
| 5,930,701 A | 7/1999 | Skog |
| 5,941,945 A | 8/1999 | Aditham |
| 5,943,399 A | 8/1999 | Bannister et al. |
| 5,946,629 A | 8/1999 | Sawyer et al. |
| 5,946,630 A | 8/1999 | Willars et al. |
| 5,949,326 A | 9/1999 | Wicks et al. |
| 5,950,130 A | 9/1999 | Coursey |
| 5,953,398 A | 9/1999 | Hill |
| 5,959,543 A | 9/1999 | LaPorta |
| 5,960,074 A | 9/1999 | Clark |
| 5,963,864 A | 10/1999 | O'Neil |
| 5,966,663 A | 10/1999 | Gleason |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,023,470 A | 2/2000 | Lee |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,078,583 A | 6/2000 | Takahara |
| 6,081,508 A | 6/2000 | West et al. |
| 6,101,378 A | 8/2000 | Barabash et al. |
| 6,119,167 A | 9/2000 | Boyle |
| 6,122,503 A | 9/2000 | Daly |
| 6,122,520 A | 9/2000 | Want et al. |
| 6,134,432 A | 10/2000 | Holmes et al. |
| 6,138,158 A | 10/2000 | Boyle et al. .................. 709/219 |
| 6,144,653 A | 11/2000 | Persson et al. |
| 6,148,197 A | 11/2000 | Bridges et al. |
| 6,148,198 A | 11/2000 | Anderson et al. |
| 6,149,353 A | 11/2000 | Nilsson |
| 6,154,745 A | 11/2000 | Kari |
| 6,169,891 B1 | 1/2001 | Gorham et al. |
| 6,173,181 B1 | 1/2001 | Losh |
| 6,173,316 B1 | 1/2001 | De Boor |
| 6,175,922 B1 | 1/2001 | Wang |
| 6,178,331 B1 | 1/2001 | Holmes et al. |
| 6,181,935 B1 | 1/2001 | Gossman et al. |
| 6,185,565 B1 | 2/2001 | Meubus |
| 6,185,602 B1 | 2/2001 | Bayrakeri |
| 6,188,752 B1 | 2/2001 | Lesley |
| 6,189,031 B1 | 2/2001 | Badger et al. |
| 6,195,651 B1 | 2/2001 | Handel et al. |
| 6,198,431 B1 | 3/2001 | Gibson |
| 6,199,045 B1 | 3/2001 | Giniger et al. |
| 6,205,330 B1 | 3/2001 | Winbladh |

(56) References Cited

U.S. PATENT DOCUMENTS

| | | |
|---|---|---|
| 6,208,854 B1 | 3/2001 | Roberts et al. |
| 6,208,870 B1 | 3/2001 | Lorello |
| 6,216,008 B1 | 4/2001 | Lee |
| 6,223,042 B1 | 4/2001 | Raffel |
| 6,223,046 B1 | 4/2001 | Hamill-Keays et al. |
| 6,226,529 B1 | 5/2001 | Bruno et al. |
| 6,244,758 B1 | 6/2001 | Solymar |
| 6,246,879 B1 | 6/2001 | Segura |
| 6,249,680 B1 | 6/2001 | Wax et al. |
| 6,249,744 B1 | 6/2001 | Morita |
| 6,263,212 B1 | 7/2001 | Ross et al. |
| 6,263,372 B1 | 7/2001 | Hogan et al. |
| 6,266,614 B1 | 7/2001 | Alumbaugh |
| 6,289,095 B1 | 9/2001 | Buttitta |
| 6,289,373 B1 | 9/2001 | Dezonno |
| 6,301,695 B1 | 10/2001 | Burnham |
| 6,311,055 B1 | 10/2001 | Boltz |
| 6,314,108 B1 | 11/2001 | Ramasubramani et al. |
| 6,317,594 B1 | 11/2001 | Gossman et al. |
| 6,321,257 B1 | 11/2001 | Kotola et al. ............... 370/465 |
| 6,327,479 B1 | 12/2001 | Mikkola |
| 6,330,600 B1 | 12/2001 | Matchefts |
| 6,353,614 B1 | 3/2002 | Borella et al. |
| 6,366,961 B1 | 4/2002 | Subbiah et al. |
| 6,370,373 B1 | 4/2002 | Gerth |
| 6,389,421 B1 | 5/2002 | Hawkins et al. |
| 6,393,014 B1 | 5/2002 | Daly et al. ................... 709/225 |
| 6,393,461 B1 | 5/2002 | Okada |
| 6,396,913 B1 | 5/2002 | Perkins et al. |
| 6,397,054 B1 | 5/2002 | Hoirup |
| 6,408,177 B1 | 6/2002 | Parikh |
| 6,421,707 B1* | 7/2002 | Miller et al. .................. 709/206 |
| 6,421,733 B1 | 7/2002 | Tso |
| 6,424,841 B1 | 7/2002 | Gustafsson |
| 6,442,589 B1 | 8/2002 | Takahashi et al. |
| 6,446,112 B1 | 9/2002 | Bunney |
| 6,446,969 B1 | 9/2002 | Denoual |
| 6,456,852 B2 | 9/2002 | Bar |
| 6,459,892 B2 | 10/2002 | Burgan |
| 6,463,145 B1 | 10/2002 | O'Neal et al. |
| 6,470,181 B1 | 10/2002 | Maxwell |
| 6,487,180 B1 | 11/2002 | Borgstahl |
| 6,493,430 B2 | 12/2002 | Leuca |
| 6,499,053 B1 | 12/2002 | Marquette et al. |
| 6,502,086 B2 | 12/2002 | Pratt |
| 6,505,046 B1 | 1/2003 | Baker |
| 6,507,589 B1 | 1/2003 | Ramasubramani et al. .. 370/465 |
| 6,512,930 B2 | 1/2003 | Sandegren |
| 6,538,561 B2 | 3/2003 | Angus |
| 6,560,456 B1 | 5/2003 | Lohtia et al. |
| 6,564,261 B1 | 5/2003 | Gudjonsson et al. |
| 6,567,979 B1 | 5/2003 | deCarmo |
| 6,587,691 B1 | 7/2003 | Grantsman et al. |
| 6,591,304 B1 | 7/2003 | Sitaraman et al. |
| 6,618,763 B1 | 9/2003 | Steinberg |
| 6,625,461 B1 | 9/2003 | Bertacchi |
| 6,654,786 B1* | 11/2003 | Fox et al. ....................... 709/203 |
| 6,658,260 B2 | 12/2003 | Knotts |
| 6,667,688 B1 | 12/2003 | Menard et al. ................ 370/352 |
| 6,674,767 B1 | 1/2004 | Kadyk |
| 6,681,257 B1 | 1/2004 | Patel |
| 6,711,411 B1 | 3/2004 | Ruffini |
| 6,718,178 B1 | 4/2004 | Sladek et al. |
| 6,771,971 B2 | 8/2004 | Smith |
| 6,785,659 B1 | 8/2004 | Landsman et al. |
| 6,826,597 B1* | 11/2004 | Lonnroth et al. ............. 709/207 |
| 6,839,562 B2 | 1/2005 | Smith |
| 6,850,916 B1 | 2/2005 | Wang |
| 6,856,804 B1 | 2/2005 | Ciotta |
| 6,886,017 B1 | 4/2005 | Jackson et al. |
| 6,915,138 B2 | 7/2005 | Kraft |
| 6,961,330 B1 | 11/2005 | Cattan |
| 6,987,969 B1 | 1/2006 | Bruing |
| 6,993,325 B1 | 1/2006 | Waesterlid |
| 7,010,303 B2 | 3/2006 | Lewis |
| 7,010,603 B2 | 3/2006 | Martin |
| 7,020,685 B1 | 3/2006 | Chen |
| 7,058,036 B1* | 6/2006 | Yu et al. ........................ 370/335 |
| 7,069,439 B1 | 6/2006 | Chen |
| 7,088,990 B1 | 8/2006 | Isomursu |
| 7,116,972 B1 | 10/2006 | Zhang et al. |
| 7,155,243 B2* | 12/2006 | Baldwin et al. ............... 455/466 |
| 7,257,122 B1* | 8/2007 | Keturi ............................ 370/401 |
| 7,318,098 B2 | 1/2008 | Steinberg |
| RE40,243 E | 4/2008 | Leuca |
| 7,366,529 B2 | 4/2008 | Alanara |
| 7,509,136 B2 | 3/2009 | Hart |
| 7,519,654 B1 | 4/2009 | Smith |
| RE40,780 E | 6/2009 | Leuca |
| 7,590,225 B2 | 9/2009 | Sivula |
| 7,627,305 B2 | 12/2009 | Helferich |
| 7,761,511 B2 | 7/2010 | Kaplan |
| 7,809,382 B2 | 10/2010 | Smith |
| 7,860,068 B2 | 12/2010 | Smith |
| 7,890,127 B2 | 2/2011 | Knotts |
| 7,991,411 B2 | 8/2011 | Johnson |
| 2001/0032267 A1 | 10/2001 | Collison |
| 2001/0034224 A1 | 10/2001 | McDowell et al. |
| 2001/0041579 A1 | 11/2001 | Smith et al. |
| 2002/0091789 A1 | 7/2002 | Katariya |
| 2003/0092454 A1 | 5/2003 | Halim |
| 2004/0148357 A1* | 7/2004 | Corrigan et al. ............... 709/206 |
| 2004/0259531 A1 | 12/2004 | Wood et al. |
| 2010/0257241 A1 | 10/2010 | Hale |

FOREIGN PATENT DOCUMENTS

| | | |
|---|---|---|
| WO | WO97/41654 | 11/1997 |
| WO | WO98/47270 | 4/1998 |
| WO | WO01/80534 | 4/2001 |

OTHER PUBLICATIONS

Answer to Counterclaim (May 4, 2009), District Court, Northern District of California, Civil Action No. CV 09-0982.
Appendix A, "Short message peer to peer (SMPP) interface specification", 09588460, Jun. 6, 2000. Whole document.
Complaint for Declaratory and Other Relief (Mar. 6, 2009) U.S. District Court, Northern District of California, Civil Action No. CV 09-0982.
Answer and Counterclaim to Complaint for Declaratory and Other Relief (Apr. 14, 2009), District Court, Northern District of California, Civil Action No. CV 09-0982.
International Search Report in PCT/US01/11547 dated Aug. 22, 2001.
International Preliminary Examination Report in PCT/US01/11547 dated Nov. 16, 2001.
Answers and Counterclaims (Sep. 29, 2009), USDC EDVA, 2:09-CV-387.
Order Defining Claim Construction (Dec. 23, 2009), USDC EDVA, 2:09-CV-387.
Supplemental Order Defining Claim Construction (Feb. 5, 2010), USDC EDVA, 2:09-CV-387.
Expert Report of Gerald J. Mossinghoff (Mar. 22, 2010), USDC EDVA, 2:09-CV-387.
Expert Report of Vijay K. Madisetto, PHD (Mar. 2, 2010), USDC EDVA, 2:09-CV-387.
Stipulated Order Dismissing with Prejudice All Claims Brought by TeleCommunication Systems, Inc., Against Sybase 365, Inc., (Mar. 29, 2010), USDC EDVA 2:09-cv-387.
Wireless Application Protocol Architecture Specification, WAP Architecture Version, Wireless Application Protocol Forum, LTD. (Apr. 30, 1998).
RPC; Remote Procedure Call, Protocol Specification, version 2 network working group, Sun Microsystems, Inc. (Jun. 1998).
Non-Final Action (Control No. 95/001,240), Nov. 13, 2009.
Non-Final Action (Control No. 95/001,240), Nov. 10, 2009.
U.S. Appl. No. 60/158,694, Chen.

* cited by examiner

MOBILE-ORIGINATED TO HTTP COMMUNICATIONS

The present application is a continuation of U.S. patent application Ser. No. 12/073,621, entitled "Mobile-Originated to HTTP Communications," filed Mar. 7, 2008; which in turn is a continuation of U.S. patent application Ser. No. 11/113,033, entitled "Mobile-Originated to HTTP Communications," filed on Apr. 25, 2005, now U.S. Pat. No. 7,355,990, which in turn is a continuation U.S. application Ser. No. 09/588,460, entitled "Short Messaging Service Center Mobile Originated to HTTP Internet Communications," filed on Jun. 6, 2000, now U.S. Pat. No. 6,891,811; which claims priority from U.S. Provisional Application No. 60/198,108, entitled "Short Messaging Service Center SMPP to HTTP Internet Communications," filed on Apr. 18, 2000, all four of which are expressly incorporated herein by reference in their entirety.

BACKGROUND OF THE INVENTION

1. Field of the Invention

This invention relates generally to communications networks. More particularly, it relates to the communication between a mobile (i.e., wireless) device and an application server via a short message service center (SMSC) and the Internet.

2. Background of Related Art

Wireless communication services are in increasing demand in response to a society which is becoming increasingly mobile. Traditionally, wireless communication services include voice cellular phone and paging services in which a user can make a telephone call or send/receive a page including a numeric message indicating a telephone number over a wireless network. More recently, paging services have been expanded to offer alphanumeric paging, which allows a short text based message to be sent to and displayed at a handheld pager.

However, voice cellular telephone and the paging services each require an intended subscriber to be on-line or active to receive a telephone call or transmitted paging message. In other words, these services do not typically offer the capability of storing the messages for a temporarily unavailable subscriber.

In the early 1990s, as a result of the growing popularity of digital wireless technology, a standard for digital wireless networks was introduced in Europe. That standard, now known as the global standard for mobiles (GSM), included a service called short messaging service (SMS). An SMS allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods. Short message services are gaining in popularity, particularly in the United States.

Short message services are advantageous over text based paging services because of the capability of bi-directional communication. Such bi-directional communication allows, for example, notification to the originating device of the success or failure of the short message delivery.

Each SMS network typically includes a short message service center (SMSC) which acts as a store-and-forward mechanism providing guaranteed delivery of short messages to a subscriber, even if the subscriber is inactive when the message was transmitted, by delivering the short messages once the subscriber becomes active. Delivery of all short messages is guaranteed regardless of whether or not the intended subscriber is "on-line" because the transmitted short message is stored within the SMS network and delivered to the intended subscriber from their assigned SMSC when the subscriber becomes available.

A variety of services have been introduced using SMS networks including, for example, integrated electronic mail and fax, integrated paging, interactive banking, and information services such as stock quotes and airline schedule delivery.

In operation, an SMSC receives a short message from any source intended to be delivered to a particular subscriber. When the intended subscriber is not available because, for example, it is turned off or is outside of the service area of the SMS network, the attempt to deliver the short message at that time will fail. In this case, the short message will be retained in the SMS network for a later delivery attempt. Thereafter, when the subscriber finally becomes available, e.g., is turned on or has moved into the service area of the SMS network, the relevant portions of the network (e.g., the mobile servicing center (MSC) and the home location register (HLR)) notify the SMSC to initiate delivery of the stored (i.e., previously failed) short messages.

FIG. 6 shows an exemplary structure of a SMS network 500. Although the following example is described using terms and protocols mainly as defined by the North American standard IS-41, it will be apparent to one skilled in the art that the example is applicable to any networks that offer store-and-forward type short message service.

The SMS network 500 typically includes one short message service center (SMSC) 501. The SMSC 501 typically includes a storage subsystem to store short messages that had failed to be delivered. The SMSC 501 typically further includes various interfaces (not shown) to receive short messages originating from various sources and protocols, such as a Voice Mail System (VMS) 508, paging networks using, e.g., Telocator Numeric Paging Protocol (TNPP) 509, devices using the Short Message Peer-to-Peer (SMPP) protocol 510 via TCP/IP, e-mail systems using the Simple Mail Transport Protocol (SMTP) 511, and/or devices using the Telocator Alphanumeric Protocol (TAP) 512. Some of the various sources of the short messages may be gateways to other networks.

The SMSC 501 may further include a gateway/interworking block (not shown) that enables the SMSC 501 to communicate with the rest of the SMS network 500, such as a Home Location Register (HLR) 503 or a Mobile Switching Center (MSC) 505, using the Signaling System No. 7 (SS7) 502. The methods and mechanism of communication in the SMS network 500 are defined by the mobile application part (MAP) layer, which uses the services of the SS7 transaction capabilities application part (TCAP) as the signaling infrastructure of the SMS network 500. The protocol for the signaling is referred to as the IS-41 protocol under the American standard as published by the Telecommunication Industry Association (TIA) or as the GSM MAP under the European standard published by European Telecommunication Standards Institute (ETSI).

The Home Location Register (HLR) 503 includes a database that permanently stores and manages subscriptions and service profiles of users having a subscription to the SMS network 500. Although only one HLR 503 is shown, the SMS network 500 may include two or more HLRs. The SMS network 500 also typically includes several visitor location registers (VLR) 504. A VLR 504 is a database temporarily holding information about visiting subscribers who move into its service area. Thus, a VLR 504 contains information regarding routing information for all subscribers within its service area, and informs the relevant HLR 503 of the availability and routing information regarding its subscribers. The mobile switching center (MSC) 505 obtains subscriber information from the VLR 504 to service visiting subscribers.

The mobile switching center (MSC) 505 performs switching and call control functions, and receives short messages from the SMSC 501 for delivery to the appropriate mobile subscriber 507 (shown, e.g., as a cellular phone handset). It is to be understood that, although only one MSC 505 is shown, the wireless network 500 may include two or more MSCs.

The base station subsystem (BSS) 506 handles the wireless communications, e.g., RF transmission and reception of voice and data traffic, to and from the mobile subscriber 507. The BSS 506 is typically composed mainly of two parts: the base transceiver station (BTS, not shown) which houses the radio transceivers that define a cell and handles the radio-link protocols with the mobile subscriber 507, and the base station controller (BSC, also not shown) which manages the radio resources, and handles radio channel set up, frequency hopping, and handoffs (or handovers as is sometimes referred as). The BSC is the interface between the MSC 505 and the subscriber 507. The subscriber 507, also sometimes referred to as a mobile station (MS), typically consists of mobile equipment (e.g., a cellular phone handset) preferably uniquely identifiable by an identifying number, e.g., mobile identification number (MIN), International mobile subscriber identification (IMSI) and/or electronic serial number (ESN), for the subscriber 507. The mobile equipment may include a storage area, e.g., a flash memory, a ROM, a RAM or the like to hold the unique identifying number within the mobile equipment. In GSM networks, a smart card, typically referred to as a subscriber identity module (SIM) is utilized to store a unique identifying number.

FIG. 7 shows an exemplary flow of a short message through a conventional SMS network. Although FIG. 7 shows only an example of short message delivery to a mobile subscriber, it is to be understood that a mobile subscriber or any other sources may originate a short message. The flow of a mobile subscriber originated short message would involve similar processes as the following mobile subscriber terminated short message example, and would be apparent to one of ordinary skill in the art.

The SMSC 601 receives a short message intended for a subscriber 604 from a source of short message 605 which may be any one or more of the aforementioned sources of short messages, e.g., 508-512 of FIG. 6. Upon receiving a short message, the SMSC 601 sends a request for routing information, i.e., an SMS request (SMSREQ), to the HLR 602. The HLR 602 maintains information regarding the availability of the intended subscriber 604 and the appropriate MSC 603 that services the intended subscriber, and sends the information as routing information 608 back to the SMSC 601. The SMSC 601 forwards the short message to the appropriate MSC 603 using the routing information 608 received from the HLR 602, for example, in accordance with the short message delivery point-to-point (SMDPP) mechanism of IS-41 standard. The MSC 603 queries the VLR (not shown) for subscriber information. The VLR may perform a paging and authentication process, and sends the subscriber information to the MSC 603. The MSC 603, using the information received from the VLR, delivers the short message to the intended subscriber 604, and sends a delivery report 612 to the SMSC 601. The SMSC 601 may send the result of the delivery, i.e., the status report 613, to the source of the short message 605 if requested.

When the attempted delivery of the short message has failed because, for instance, the intended user was out of the service area, or had his or her communication device turned off, the MSC 603 informs the HLR 602 of the failure. The HLR 602 then turns on an SMS notification indicator flag for the subscriber, and the SMSC 601 retains the failed message for a later delivery attempt.

FIG. 8 shows a pending short message delivery process in a conventional short message service network after the mobile subscriber becomes available for delivery of the retained messages. In particular, in FIG. 8, when the subscriber 704 turns his or her handset on or comes within the service area, the subscriber's handset sends a registration signal 709 to the MSC 703. The registration signal 709 may or may not include authentication process.

Upon receiving the registration signal 709, the MSC 703 informs the HLR 702 (or the VLR 711) of the availability of the subscriber 704 by sending a subscriber available signal 708. Because the SMS notification flag for the subscriber is on, the HLR 702 or the VLR 703 sends an SMS notification (SMSNOT) message 705 in case of networks implementing IS-41 standard, or an equivalent notification alerting the fact that the subscriber has become available in networks implemented in accordance with other standards, to the SMSC 701 assigned to service that particular intended subscriber 704.

The SMSC 701 then sends a delivery request 706 to the MSC 703 via, for example, the SMDPP protocol in the IS-41 standard. The MSC 703 finally delivers the short message 710 to the subscriber 704, and sends a message delivered message 707 back to the SMSC 701 to confirm and finalize the delivery of the short message. The SMSC 701 may further send a delivery report to the source of the short message if it was requested.

The Wireless Application Protocol (WAP) attempts to standardize a mechanism for two-way communications. However, WAP requires that a special browser be loaded on the handset, and requires the user to enter into a dedicated 'browser mode' in order to interact with 2-way services.

There is a need for a standardized solution allowing short message communications between wireless devices and application servers on the Internet without the need for a specialized browser, while making use of existing communication standards utilized by standard SMSCs, e.g., SMPP.

SUMMARY OF THE INVENTION

In accordance with the principles of the present invention, a gateway comprises a first communication path to accept a short message from a short message service center. A translation module inserts the short message into an HTTP protocol message. A second communication path transmits the HTTP protocol message to at least one URL.

A method of communicating between a wireless device and an application program on an Internet Protocol server in accordance with another aspect of the present invention comprises sending a short message from the wireless device to the Internet Protocol server. The short message is routed using a wireless protocol message. The short message is conveyed to the Internet Protocol server using an HTTP protocol POST message.

A mobile to HTTP gateway application in accordance with yet another aspect of the present invention comprises an SMPP relayer, a message director to process messages from the SMPP relayer, a poster collector to obtain at least one target poster, and a poster.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a mobile-to-HTTP protocol gateway (MHG, or "MO Gateway") which translates between standard wireless protocol commands (e.g., SMPP from an SMSC), and an application server on the Internet (i.e., a "Web Server").

An MHG in accordance with the principles of the present invention allows any standard 2-way SMS capable handset to interact with specialized web applications. Using an MHG, it is no longer necessary for a user to launch a phone browser in order to access the services. Moreover, an MHG provides a simpler model than WAP for developing 2-way applications.

The disclosed embodiment of an MO-HTTP gateway uses the SMPP protocol. However, the principles of the present invention relate equally to other 2-way messaging protocols, e.g., ReFlex for 2-way pagers.

The MO-HTTP gateway provides a mechanism for developers to produce 2-way wireless applications using familiar Web-based tools and methodologies. The MO-HTTP gateway hides the details of communicating with the wireless network by interacting with applications using familiar HTTP posting. By adopting SMS and SMPP for its reference implementation, the MO-HTTP gateway avoids problems common to the WAP environment.

Utilizing an MHG in accordance with the principles of the present invention, a developer may create mobile applications using standard Web development tools, e.g., Java Servlets.

Figure 1:
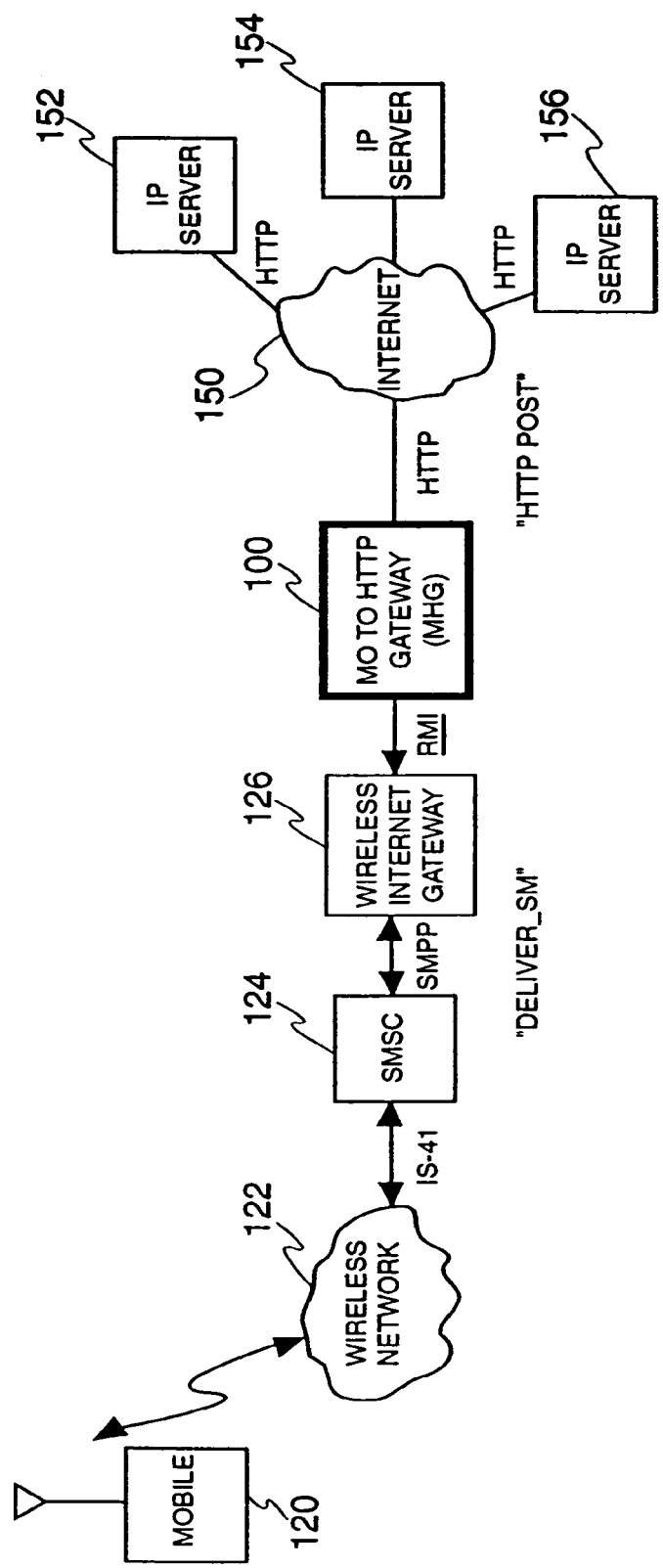
FIG. 1 illustrates an exemplary system adapted to push mobile originated (MO) messages to an IP (web) sever, in accordance with the principles of the present invention.

FIG. 1 illustrates an exemplary system adapted to push mobile originated (MO) messages to an IP (web) sever using standardized equipment and message protocols together with an MHG 100, in accordance with the principles of the present invention.

In particular, as shown in FIG. 1, a mobile (i.e., wireless) device 120 communicates with an appropriate wireless network 122 using any appropriate wireless standard protocol. In turn, the wireless network 122 communicates with a short message service center 124 using standard IS-41 communication protocol messages.

Appendix A attached hereto is a document entitled "SHORT MESSAGE PEER TO PEER (SMPP) INTERFACE SPECIFICATION" describing relevant features of mobile originated communications using Short Message Peer-to-Peer Protocol (referred to herein as SMPP).

The SMSC 124 communicates with a wireless internet gateway 126 via SMPP protocol commands in substantial conformance with the SMPP interface specification attached hereto in Appendix A.

A suitable wireless Internet gateway 126 is described in co-owned U.S. Appl. No. 60/199,367, filed on Apr. 11, 2000, entitled "Wireless Internet Gateway", by Richard Smith, the entirety of which is expressly incorporated herein by reference.

The wireless Internet Gateway 126 communicates with a MHG 100 using Java Remote Method Invocation (RMI) technology to provide server-to-server capability.

The mobile to HTTP Gateway (MHG) 100 translates standard format RMI protocol commands from the wireless Internet gateway 126 into HTTP protocol commands, and directs the same to an appropriate Internet protocol (IP) server (i.e., web application server) 152, 154, and/or 156 in communication with the Internet 150.

Figure 2:
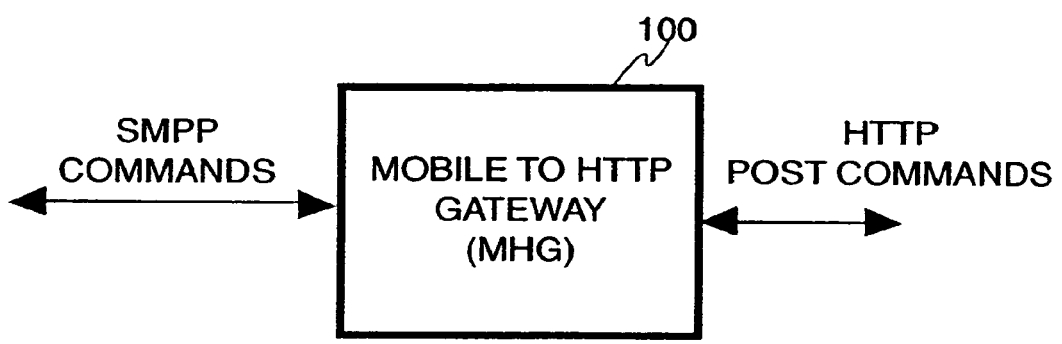
FIG. 2 depicts a mobile-to-HTTP gateway (MHG) as a 'black box' which is easily installed into existing systems to enable bi-directional communication between a mobile device and one or more IP servers within the parameters of standard protocol communications (e.g., SMPP and HTTP) between system elements, in accordance with the principles of the present invention.

FIG. 2 depicts the MHG 100 as a 'black box' which is easily installed into existing systems to enable bi-directional communication between a mobile device 120 and one or more IP servers 152-156 within the parameters of standard protocol communications (e.g., SMPP and HTTP) between system elements, in accordance with the principles of the present invention.

In particular, as shown in FIG. 2, the mobile to HTTP gateway (MHG) 100 preferably is bi-directional in that it generates HTTP protocol POST commands to an application program on a relevant IP server 152-156 based on mobile-originated messages, and translates responses to the same from HTTP protocol back into standard format SMPP messages for forwarding back to the relevant mobile device 120.

In accordance with the principles of the present invention, an HTTP protocol POST command is used by the MHG 100 to forward a request from the mobile device 120 to the relevant web IP server(s) 152-156. The HTTP protocol POST command is well known and documented in, e.g., RFC2068 and later IETF RFC's on the subject. This document is publicly available, e.g., at http://ietf.org/rfc.html.

In particular, as is known within the HTTP protocol, an HTTP protocol POST command is used to request that a particular destination web IP server 152-156 accept the entity enclosed in the request (i.e., the mobile device 120) as a new subordinate of the resource identified by the Request-URI in the Request-Line.

The HTTP protocol POST command is designed to allow a uniform method for various tasks, e.g., to allow annotation of existing resources, to allow posting of a message to a bulletin board, newsgroup, mailing list, or similar group of articles, to provide a block of data, such as the result of submitting a form, to a data-handling process, and/or to extend a database through an append operation. The actual function performed by the HTTP protocol POST method is determined by the particular web IP server 152-156, and is usually dependent on the Request-URI. The posted entity (i.e., the wireless device 120) is subordinate to that URI in the same way that a file is subordinate to a directory containing it, a news article is subordinate to a newsgroup to which it is posted, or a record is subordinate to a database.

The action performed by the HTTP protocol POST command might not result in a resource that can be identified by a URI. In this case, either 200 (OK) or 204 (No Content) is the appropriate response status, depending on whether or not the response includes an entity that describes the result. If a resource has been created on the origin server, the response should be 201 (Created) and contain an entity which describes the status of the request and refers to the new resource, and a location header.

Responses to the HTTP protocol POST are not cachable, unless the response includes appropriate Cache-Control or Expires header fields. However, the 303 (See Other) response can be used to direct the user agent to retrieve a cachable resource.

With respect to the MHG 100, the submitted HTTP protocol POST command includes mobile_num, resp_track_id and body fields. Also embedded within the HTTP protocol POST command is a CGI name/value pair providing information about the particular request from the mobile device 120.

A response back to the mobile device 120 originates from the relevant web IP server 152-154 synchronously in response to the received HTTP protocol POST command.

Particular features of the standard SMPP utilized by various aspects of the present invention include the following:

Use of a registered_delivery flag.
Use of an "$R" trigger in the body of every MO message indicating a source-unique tracking number for SMPP v3.3, version 3.4 provides an explicit field for a tracking number and therefore the trigger is not required.
Use of user responses contained within the stat component of a standard delivery receipt.
Use of message types identified by the esm_class field.

Figure 3:
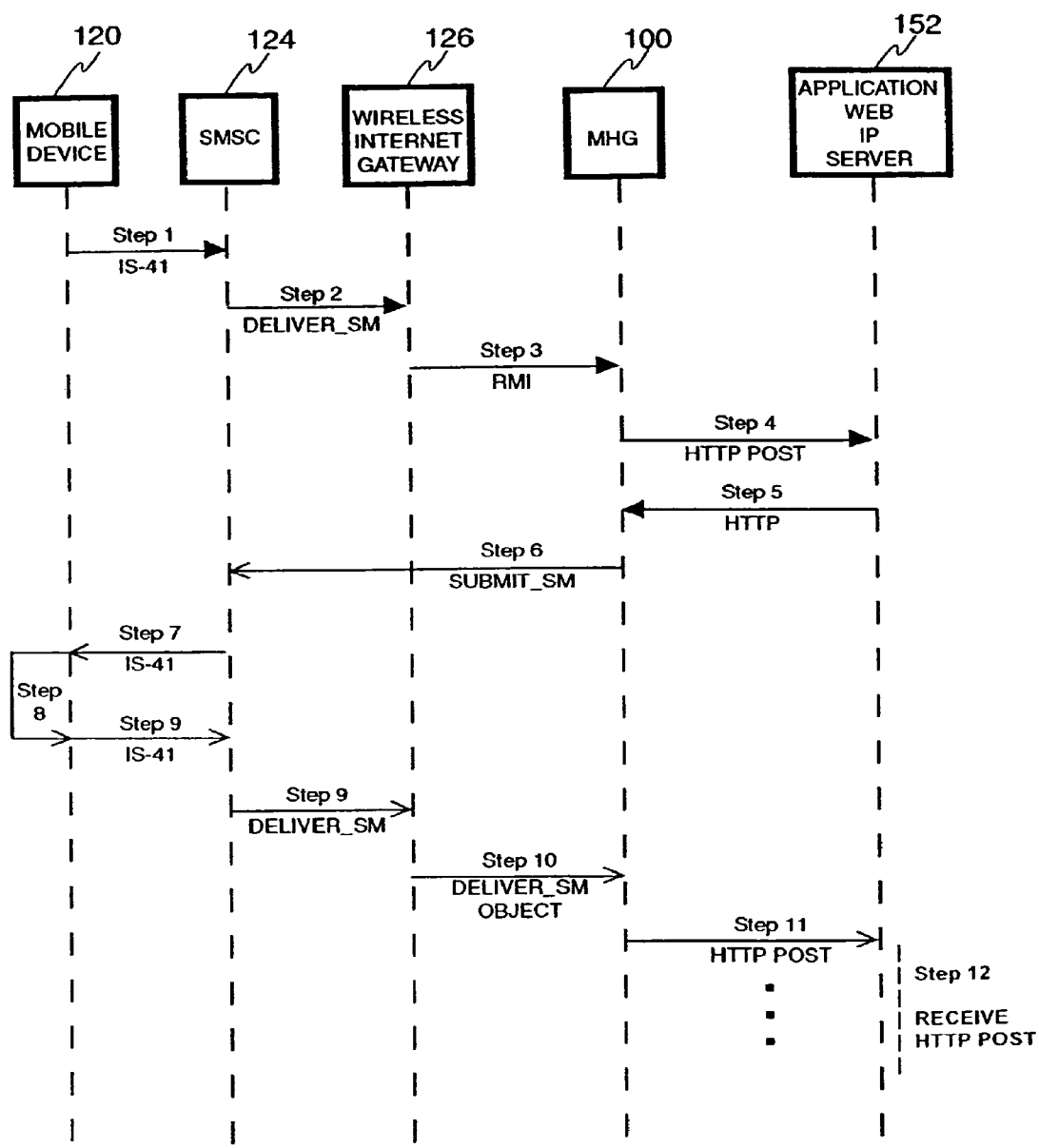
FIG. 3 shows a message flow between the system elements shown in FIG. 1.

FIG. 3 shows an exemplary message flow between the system elements shown in FIG. 1.

In particular, the following steps 1 to 12 are depicted between system elements in FIG. 3 as an example of message routing between a mobile device 120 and a relevant web IP server 152-154.

Step 1

The mobile device 120 sends a short message to a predefined address (e.g., 'info', or 4636). If the body of the short message is empty, or if the body contains a special string such as 'menu', then ultimately a menu would be sent by the HTTP Application on the relevant web IP server 152-156 to the mobile device 120.

Other bodies may be used to, e.g., identify global commands, or provide context-sensitive information from the mobile device 120 to the HTTP application on the web IP server 152-156. Requirements for body content depend on the particular HTTP application as it exists on the particular web IP server 152-156.

Step 2

The SMSC 124 routes the short message to an ESME (e.g., the wireless Internet gateway 126) for delivery using a standard SMPP protocol DELIVER_SM message. As disclosed, the MHG 100 utilizes the following fields of the DELIVER_SM command: service_type, source_addr, destination_addr, registered_delivery_flag, esm_class, and short_message.

In particular, the MHG 100 utilizes the service_type parameter to indicate the SMS application service associated with the message. For instance, the service_type field may be populated with the value 'page'.

The source_addr is the address of the SME (e.g., mobile device 120) that originated the short message. As disclosed, the source_addr is the Mobile Identification Number (MIN) of the mobile device 120 making the request.

The destination_addr is the address of the destination SME. As disclosed, the destination_addr may be assumed to be '4636' as indicated in Step 1 above. This address is used to route the request to the appropriate HTTP URL.

The registered_delivery_flag indicates if an SME Acknowledgement is necessary. As disclosed, the registered_delivery_flag is set to a default value of 0, which indicates that no delivery receipt is requested.

The esm_class indicates the message type and Enhanced network services.

The short_message field contains up to 254 octets of short message user data.

Thus, key fields of the DELIVER_SM command may be populated by the MHG 100 as follows:

| | |
|---|---|
| service_type: | page |
| source_addr: | mobile's MIN |
| destination_addr: | 4636 |
| registered_delivery_flag: | 0 |
| esm_class: | 0 |
| short_message: | $R[new ref id]$M[message] |

The $R in the short_message is optional, and is applicable for use with SMPP v3.3. The $R may be used when correlating responses from the mobile device 120 to Reply-request messages from the application program on the relevant web IP server 152-156. For consistency, the $R is preferably always present in short messages from the mobile device 120.

Step 3

When the wireless Internet gateway 126 receives the SMPP message from the SMSC 124, it creates a DELIVER_SM object. The DELIVER_SM object is forwarded by the wireless Internet gateway 126 to any relevant remote applications that are registered to receive messages on a specified ports/link ID, e.g., the MHG 100 if the MHG 100 is registered with the wireless Internet gateway 126 to receive SMPP messages. The transmission is accomplished through an RMI callback mechanism.

Step 4

The MO-HTTP Gateway (MHG) 100 receives the DELIVER_SM message object from the wireless Internet gateway 126, and formulates an HTTP protocol POST command message to a web server on the Internet 150 to convey the message content. The MHG 100 can direct the HTTP protocol POST command messages to one or to multiple URLs.

The particular web server to reference is determined by the included destination address, assuming that the SMPP destination address field contains the targeted number, e.g., '4636'. The HTTP protocol POST command message may be routed based on the SMPP port utilized.

As disclosed, exemplary name/values that may be utilized in the HTTP protocol POST command message sent to the web server are the mobile_num, resp_track_id, and body.

The mobile_num may be the mobile identification number (min) identifying the originating mobile number of the relevant mobile device 120.

The resp_track_id may be the reference ID (ref id) for user acknowledgements used to track questions and related answers.

The body may be the payload content from the mobile device 120 included in the message body field.

As embodied, by default, only SMPP messages with esm_class values of '0' and '16' are forwarded by the wireless Internet gateway 126 to the web IP server 152-156. That is, only new mobile originated requests and/or menu responses are forwarded.

If, for instance, the SMPP message type is '16', then the resp_track_id variable may contain the reference ID. On the other hand, if the message type is '0', then the reference ID is not passed to the relevant web IP server(s) 152-156.

Utilization of the SMPP message type and inclusion/non-inclusion of the reference ID reduces network traffic and resource requirements, and simplifies development on the web side.

Step 5

The relevant web server in the Internet 150 receives the HTTP protocol POST command information, which may be handled by the actual CGI/Servlet routine specified by the URL in Step 4.

The handling servlet may create sessions for each mobile device such that the current state of the mobile device may be preserved, allowing meaningful content to be transmitted. Example wireless web applications may include menu-based services, games, and information services.

After the servlet of the web server in the Internet 150 receives the HTTP protocol POST command, the servlet synchronously returns data through the HTTP stream back to the MHG 100. The text returned by the servlet may be delivered to the mobile device 120 as a standard SMS message.

The returned data may be contained within an <SMS> and </SMS> tag-set. The <SMS> and </SMS> tags are special tags used by the MHG 100 to denote SMSC Type data. As the number and/or variety of applications increase, additional tags may be implemented.

As disclosed, there are several fields embedded within the <SMS> and </SMS> tags: mobile_num, resp_track_id, and body.

The mobile_num field includes a mobile identification number of the mobile device 120 that a relevant short message is destined for.

The resp_track_id field includes a unique identification number generated by the servlet. The MHG 100 returns this id to the servlet for responses.

The body field includes the text to send to the desired mobile device 120. If the body field is blank, then nothing will be sent to the mobile device 120.

If the servlet requires a single-button user response (e.g., for a menu), then the "<RESP_TRACK_ID value='x'>" tag can be included prior to the </SMS> tag. This tells the system that a menu is required and that the specified unique tracking number should be used.

When the user of the mobile device 120 responds to this message, this same tracking id may be returned in the resp_track_id cgi variable.

For ease of description of some of the following steps, an example using the scenario described above is introduced wherein the servlet returns the following:

```
<SMS> Do you like cookies (Y/N)?
  <RESP_TRACK_ID value="1234"> </SMS>
```

Step 6

After having posted its data to the web server in the Internet 150, the MHG 100 receives a response from the same connection, as described in Step 5. A standard SUBMIT_SM MT message is generated from the text received within the <SMS> tag set.

In particular, the SUBMIT_SM message is issued by the ESME (e.g., the wireless Internet gateway 126) to submit a short message to the SMSC 124 for transmission to a specified mobile device 120. In creating a SUBMIT_SM message destined for the SMSC 124, the conventional SMPP Protocol specification is followed, with the exception of the following mapping implemented between the SUBMIT_SM message and data received in the <SMS> and </SMS>.

A registered_delivery_flag in the SUBMIT_SM message informs the SMS that the ESME (wireless Internet gateway) 126 requires a notification when the message has been delivered. If the RESP_TRACK_ID is provided (i.e., contains a value), then the registered_delivery_flag field is set to '8' for the MHG 100 indicating 'SME Manual/User Ack requested', and a special tag of R$[track id] is included in the message body. Preferably, this same tracking id will be returned in the response message from the mobile device 120.

A short_message in the SUBMIT_SM message is the payload containing up to 160 bytes of data that should be transmitted to the mobile device 120. An empty body indicates that no message is to be sent to the mobile. If the RESP_TRACK_ID value is set, then a special tag of "$R" concatenated with the value from the RESP_TRACK_ID and the tag "$M" must be prepended to the short message.

The other fields of the SUBMIT_SM message are used as conventionally known and described in the SMPP Protocol.

Step 7

The SMSC 124 receives the SUBMIT_SM message and delivers a short message, with manual ack request, to the mobile device 120.

Step 8

The mobile device 120 responds to the "Do you like cookies?" question, e.g., by pressing '9' for Yes.

Step 9

The SMSC 124 receives the response from the mobile device 120 and formulates a DELIVER_SM message. The formulated DELIVER_SM message is forwarded to the wireless Internet gateway 126.

Key parameters in the DELIVER_SM message may be populated as follows:

| | |
|---|---|
| service_type: | page |
| source_addr: | [mobile's MIN] |
| destination_addr: | 4636 |
| registered_delivery_flag: | 0 |
| esm_class: | 16 |
| short_message: | R1234$[Response Value] |

The response code is shown directly after the $M value.

Step 10

The wireless Internet gateway 126 receives the DELIVER_SM message from the SMSC 124, converts the DELIVER_SM message into an object, and forwards the DELIVER_SM message to any listeners (e.g., the MHG 100). In the disclosed example, the MHG 100 may be listening to the wireless Internet gateway 126 on a specified port, and therefore receive the DELIVER_SM message from the specified port.

Step 11

The MHG 100 receives the DELIVER_SM object, and determines if the esm_class is '16'. If so, the short message is translated by the MHG 100 and forwarded to its web listeners.

A URL is associated with either the SMPP link ports or the destination address through a configuration file of the MHG 100. The MHG 100 therefore formulates an HTTP protocol POST command message to the appropriate URL(s).

As disclosed, the HTTP protocol POST command message may contain the following name/value pairs:

mobile_num=[mobile num]
resp_track_id=123
body=9

To ease the burden of the web developer, the MHG 100 may include the response code only for messages where esm_class='16'. Thus, if the esm_class is not '16', the response code need not be included. Regardless of how the MSG 100 receives it, it need pass only the response code in the body field.

Step 12

The servlet associated with the specified URL receives the HTTP protocol POST command message from the MHG 100.

The servlet may retrieve a session object for the particular value of the mobile_num, and determines that it had just asked the mobile device 120 about a cookie preference.

The servlet may confirm that the query's tracking ID correlates to the resp_track_id value. Thus, the servlet knows that the response at hand is in response to that question. Since the body contains the content '9' (or 'Y' or other suitable response), the servlet may rightfully conclude that the user of the mobile device 120 (who input the '9' response) likes cookies.

A conversation or communication between the mobile device 120 and an application on one or more particular web IP servers 152-156 may continue on as described in steps 1 to 12 indefinitely.

Figure 4:
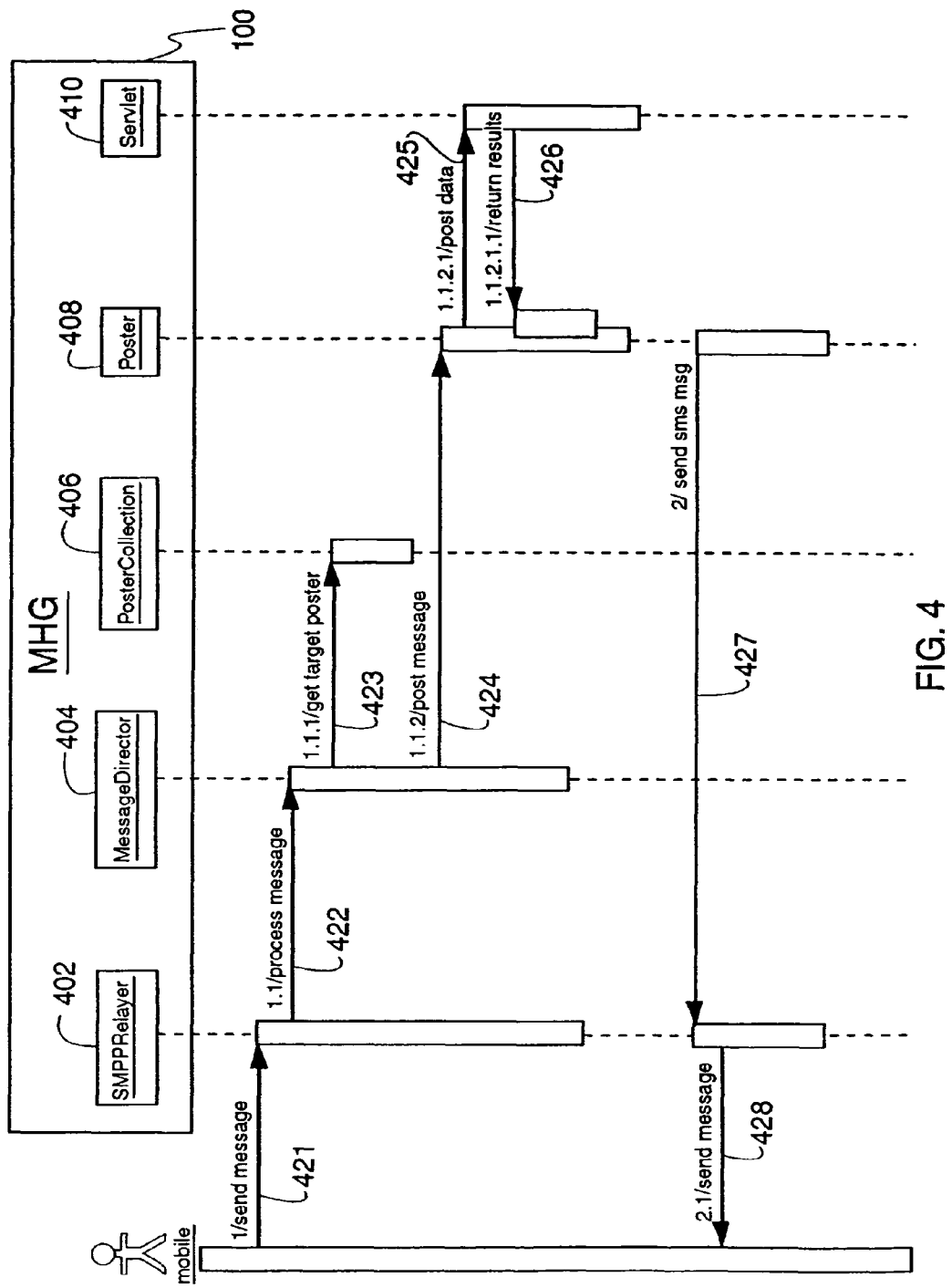
FIG. 4 shows software elements of an exemplary MO-HTTP Gateway (MHG) 100, in accordance with the principles of the present invention.

FIG. 4 shows software elements of an exemplary MO-HTTP Gateway (MHG) 100, in accordance with the principles of the present invention.

In particular, as shown in FIG. 4, the software elements of the MHG 100 include an SMPPRelayer 402, a MessageDirector 404, a PosterCollection 406, a Poster 408, and a Servlet 410.

In accordance with the principles of the present invention, one or more SMPPRelayers 402 will register as listeners to specified link IDs of the wireless Internet gateway 126.

In message 421 shown in FIG. 4, SMPP messages are sent by the wireless Internet gateway 126 to the SMPPRelayer 402 of the MHG 100 as they are received.

In message 422, the SMPPRelayer 402 forwards each message to a MessageDirector 404.

In message 423, the MessageDirector 404 retrieves a Poster 408 from the PosterCollection 406, and then in message 424 tells the Poster 408 to process the SMPP Message.

In message 425, the Poster 408 converts the SMPP Message into an HTTP protocol POST command request 425 to a specific universal resource locator (URL), and receives return results back in message 426.

In message 427, the Poster 408 returns the results back to the SMPPRelayer 402, so that it will be sent to the mobile device 120, as depicted in message 428.

Figure 5:
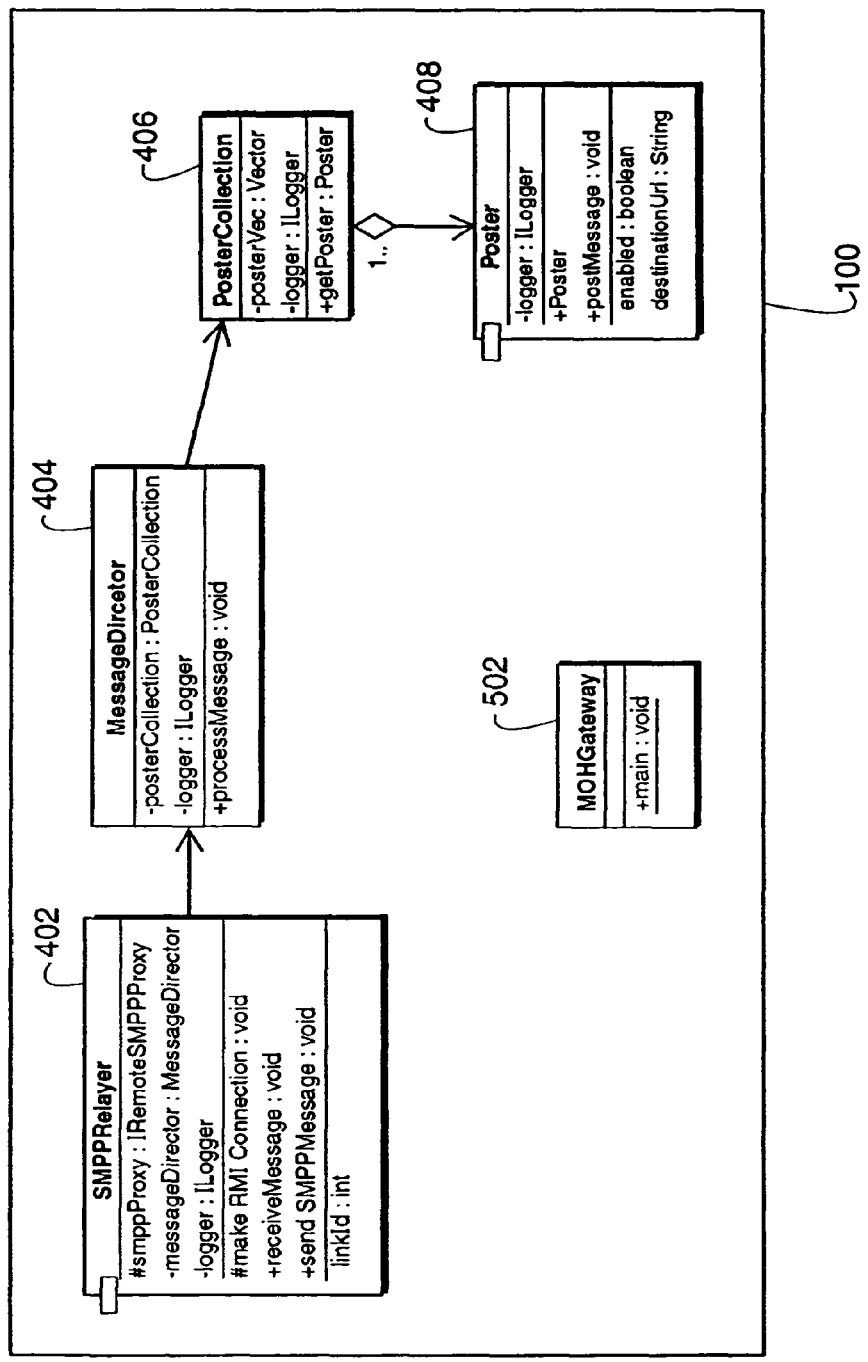
FIG. 5 shows various classes in an exemplary embodiment of a MHG 100, in accordance with the principles of the present invention.
Figure 6:
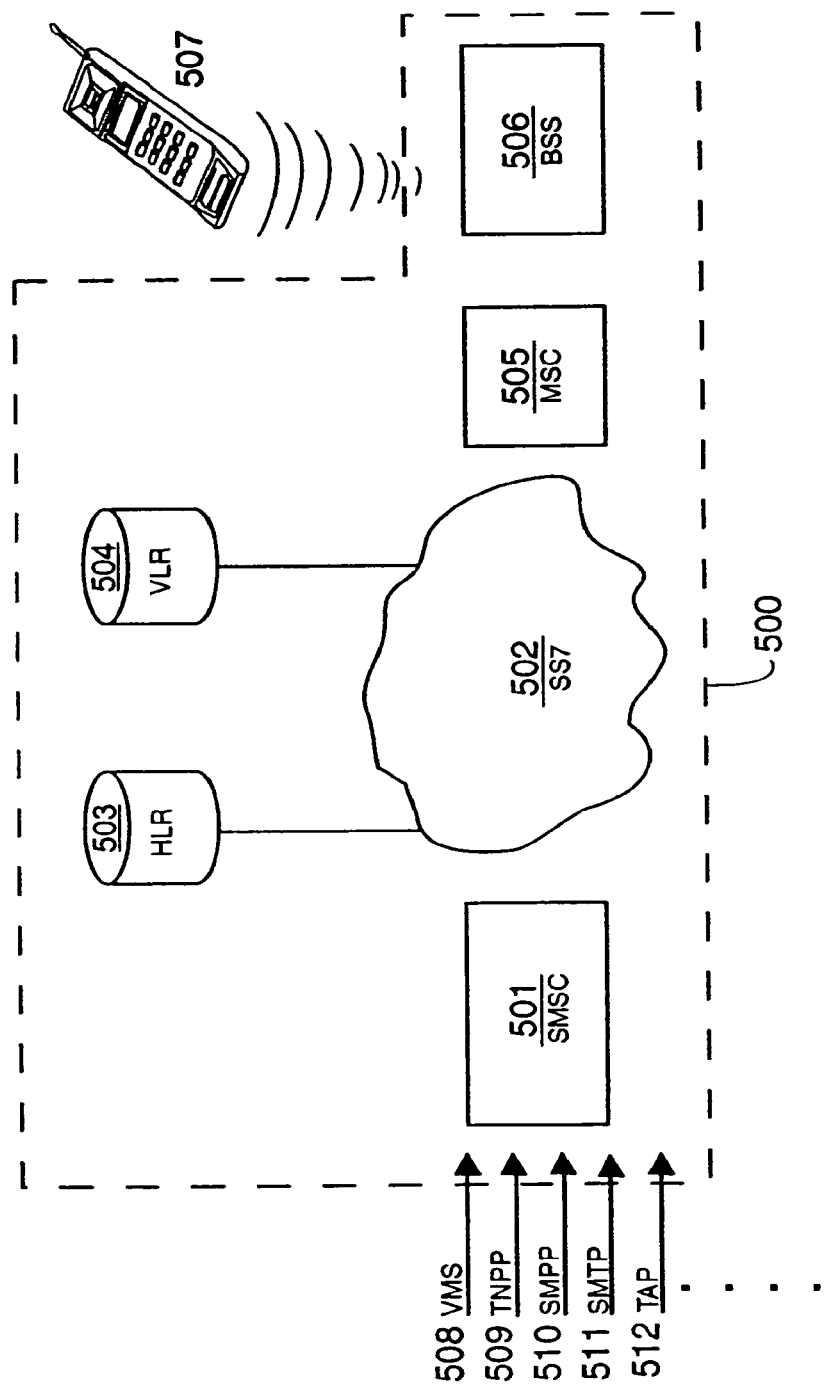
FIG. 6 shows relevant portions of a conventional short message service network.
Figure 7:
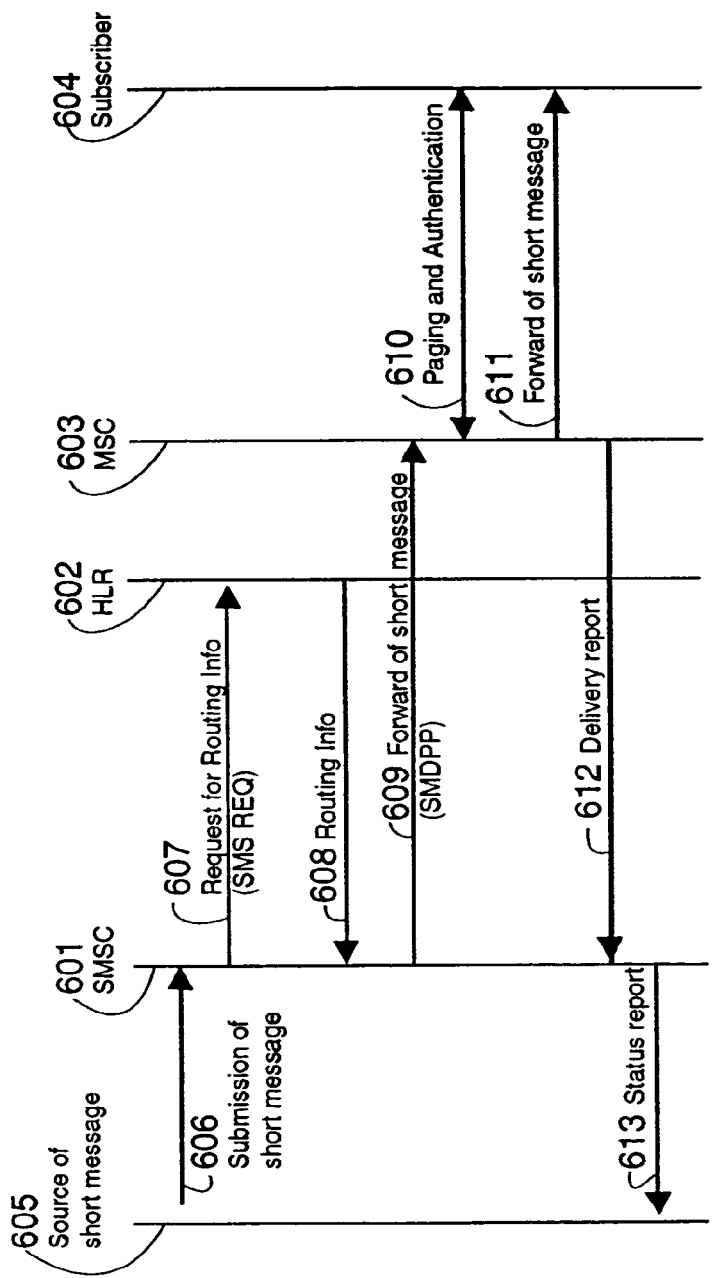
FIG. 7 shows a process of short message flow within a conventional short message service network.
Figure 8:
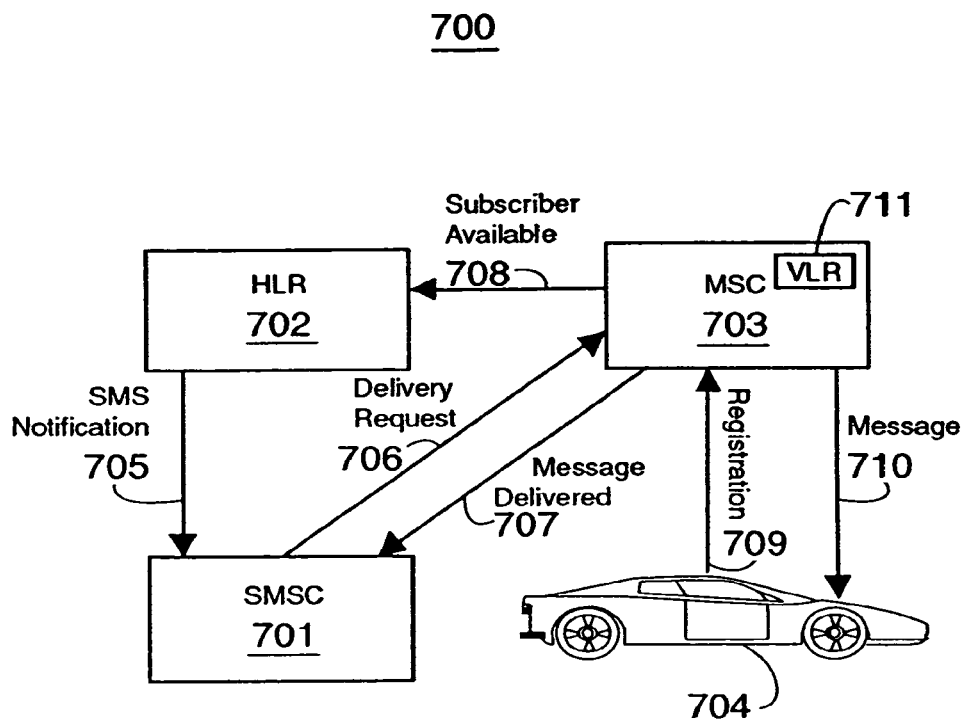
FIG. 8 shows a pending message delivery process in a conventional short message service network.

FIG. 5 shows various classes in an exemplary embodiment of a MHG 100, in accordance with the principles of the present invention.

In particular, as shown in FIG. 5, the MHG 100 includes a MOHGateway class 502, an SMPPRelayer class 402, a MessageDirector class 404, a PosterCollection class 406, and a Poster class 408.

The MOHGateway class 502 defines "main( )", and upon execution will create the SMPPRelayer class 402, the MessageDirector class 404, and the PosterCollection class 406, assigning references to one another as appropriate.

The PosterCollection class 406 accesses a standard application resource class to determine the number of Posters 408 required, as well as the desired configuration of each Poster 408. The PosterCollection class 406 creates the Posters 408 and provides references to the Posters 408 through a getPoster (SMPPMessage msg) method.

The SMPPRelayer class 402, the MessageDirector class 404, the PosterCollection class 406, and the Poster 408 each receive an ILogger object for recording information.

While the invention has been described with reference to the exemplary embodiments thereof, those skilled in the art will be able to make various modifications to the described embodiments of the invention without departing from the true spirit and scope of the invention.

What is claimed is:

1. A physical gateway, comprising:
   a first communication path connected to said physical gateway to accept, at said physical gateway, a text message;
   a translation module, at said physical gateway, to insert said text message into an Internet Protocol (IP) protocol message; and
   a second communication path connected to said physical gateway to transmit, from said physical gateway, said IP protocol message to at least one universal resource locator (URL);
   wherein said physical gateway facilitates two-way short message service communication between text message devices.

2. The physical gateway according to claim 1, wherein:
   said IP protocol message is a POST message.

3. The physical gateway according to claim 1, wherein:
   said text message originated from a wireless device.

4. The physical gateway according to claim 1, wherein:
   said text message is received via a Java Remote Method Invocation (RMI) callback mechanism.

5. The physical gateway according to claim 1, wherein:
   said second communication path is adapted to transmit said IP protocol message to a plurality of URLs.

6. The physical gateway according to claim 1, wherein:
   said second communication path accepts a return message from said at least one URL;
   said translation module inserts said return message into another text message; and
   said first communication path transmits said another text message to a short message service center.

7. The physical gateway according to claim 6, wherein:
   said return message conforms to HyperText Transfer Protocol (HTTP).

8. The physical gateway according to claim 1, wherein:
   said first communication path transmits a SUBMIT_SM message to a short message servicing center.

9. A method of communicating a text message with a physical gateway, comprising:
   accepting, at a physical gateway, a text message from a first communication path connected to said physical gateway;
   inserting, by a translation module of said physical gateway, said text message into an Internet Protocol (IP) protocol message; and transmitting, from said physical gateway, on a second communication path connected to said physical gateway said IP protocol message to at least one universal resource locator (URL);
wherein said physical gateway facilitates two-way text message communication between text message devices.

10. The method of communicating a text message with a physical gateway according to claim 9, wherein:
said IP protocol message is a POST message.

11. The method of communicating a text message with a physical gateway according to claim 9, wherein:
said text message originated from a wireless device.

12. The method of communicating a text message with a physical gateway according to claim 9, further comprising:
receiving said text message via a Java Remote Method Invocation (RMI) callback mechanism.

13. The method of communicating a text message with a physical gateway according to claim 9, further comprising:
adapting said second communication path to transmit said IP protocol message to a plurality of URLs.

14. The method of communicating a text message with a physical gateway according to claim 9, further comprising:
accepting, from said second communication path, a return message from said at least one URL;
inserting, with said translation module, said return message into another text message; and
transmitting, with said first communication path, said another text message to a short message service center.

15. The method of communicating a text message with a physical gateway according to claim 14, wherein:
said return message conforms to HyperText Transfer Protocol (HTTP).

16. The method of communicating a text message with a physical gateway according to claim 14, further comprising:
transmitting, with said first communication path, a SUBMIT_SM message to a short message servicing center.

17. The method of communicating a text message with a physical gateway according to claim 9, wherein:
said second communication path accepts a return message from said at least one URL;
said translation module inserts said return message into another text message; and
said first communication path transmits said another text message to a short message service center.

18. The method of communicating a text message with a physical gateway according to claim 17, wherein:
said return message conforms to HyperText Transfer Protocol (HTTP) protocols.

19. The method of communicating a text message with a physical gateway according to claim 9, wherein:
said first communication path transmits a SUBMIT_SM message to a short message servicing center.

20. A method of using a computer system to facilitate two-way communication between a mobile device and an Internet server, comprising:
the computer system receiving a text message via a first communication path;
the computer system inserting at least a message body of the text message into an Internet Protocol (IP) message; and
the computer system transmitting the IP message to the Internet server, via a second communication path,
wherein the text message originates from the mobile device as a short message service (SMS) text message, and
wherein the SMS text message contains a multi-digit address that is fewer than seven digits and that is associated with a URL of the internet server.

21. The method as set forth in claim 20, wherein the mobile device comprises a cellular telephone.

22. The method as set forth in claim 20, wherein the SMS text message is received by the computer system via an SMS service center (SMSC).

23. The method as set forth in claim 22, wherein the first communication path includes a path portion that traverses the SMSC.

24. The method as set forth in claim 20, wherein the SMS text message is received by the computer system via a Short Message Peer-to-Peer (SMPP) protocol.

25. The method as set forth in claim 20, wherein the second communication path includes the Internet.

26. The method as set forth in claim 20, wherein the first communication path includes a path portion that traverses an SMS service center (SMSC).

27. The method as set forth in claim 26, wherein the second communication path includes the Internet.

28. The method as set forth in claim 20, further comprising translating the text message from the SMPP protocol to the IP protocol.

29. The method as set forth in claim 20, further comprising receiving at the computer system a response message from the Internet server.

30. The method as set forth in claim 29, wherein the response message comprises a response text message.

31. The method as set forth in claim 30, wherein the response text message comprises an IP message having a message body that contains text.

32. The method as set forth in claim 30, further comprising inserting at least a message body of the response text message into a return text message.

33. The method as set forth in claim 32, further comprising transmitting the return text message to the mobile device via a Short Message Service Center (SMSC).

34. The method as set forth in claim 33, wherein the return text message is transmitted to the SMSC via an SMPP protocol.

35. The method as set forth in claim 32, wherein the return text message comprises an SMS message.

36. The method as set forth in claim 29, further comprising translating a protocol of the response message from an Internet Protocol to another protocol.

37. The method as set forth in claim 36, wherein the another protocol comprises a Short Message Peer-to-Peer (SMPP) protocol.

38. The method as set forth in claim 29, further comprising the computer system transmitting the response message to the mobile device via a communication path that includes the Short Message Service Center (SMSC).

39. The method as set forth in claim 29, wherein the response message comprises an HTTP message.

40. The method as set forth in claim 20, wherein the Internet server is associated with a URL, and the message body of the text message does not contain the URL.

41. The method as set forth in claim 20, wherein the text message contains no greater than 160 characters.

42. The method as set forth in claim 20, further comprising receiving a delivery notification message from the IP server indicating whether or not the IP message was successfully delivered.

43. The method as set forth in claim 20, wherein the transmitting comprises transmitting the IP message to a web application instantiated on the Internet server.

44. The method as set forth in claim 20, wherein the IP message comprises an HTTP message.

45. The method as set forth in claim 44, wherein the HTTP message comprises an HTTP POST message.

46. The method as set forth in claim 20, further comprising inserting a message identification field in the IP message to uniquely identify the IP message, wherein the inserting the message identification field facilitates the two-way communication.

47. The method as set forth in claim 20, further comprising inserting a mobile device identifier into the IP message.

48. The method as set forth in claim 47, wherein the message identifier enables tracking of the IP message.

49. The method as set forth in claim 20, further comprising examining a field of the text message to determine if it has a first value or a second value, and inserting a message identifier into the IP message in the event it is determined that the field has a first value, and not inserting the message identifier into the IP message in the event it is determined that the field has a second value.

50. The method as set forth in claim 49, wherein the message identifier enables tracking of the IP message.

51. The method as set forth in claim 49, wherein the field comprises an esm_class field of the SMS message.

52. The method as set forth in claim 20, wherein the computer system comprises a gateway.

53. The method as set forth in claim 20, further comprising transmitting the IP message to a plurality of additional IP servers.

54. The method as set forth in claim 20, wherein the SMS message includes a registered delivery flag.

\* \* \* \* \*